United States Patent
Banholzer et al.

(10) Patent No.: US 7,360,428 B2
(45) Date of Patent: Apr. 22, 2008

(54) CAPACITIVE PRESSURE MEASURING CELL WITH A MEMBRANE BED

(75) Inventors: Karl-Heinz Banholzer, Hausen (DE); Karl Flögel, Schopfheim (DE); Frank Hegner, Lörrach (DE); Bernd Rosskopf, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 836 days.

(21) Appl. No.: 10/399,398

(22) PCT Filed: Sep. 15, 2001

(86) PCT No.: PCT/EP01/10684

§ 371 (c)(1),
(2), (4) Date: Aug. 12, 2003

(87) PCT Pub. No.: WO02/33372

PCT Pub. Date: Apr. 25, 2002

(65) Prior Publication Data

US 2006/0243053 A1 Nov. 2, 2006

(30) Foreign Application Priority Data

Oct. 19, 2000 (DE) ................................ 100 52 053

(51) Int. Cl.
*G01L 7/08* (2006.01)
(52) U.S. Cl. .......................................... 73/715; 73/718
(58) Field of Classification Search .................. 73/700, 73/715; 361/283.1

See application file for complete search history.

(56) References Cited

U.S. PATENT DOCUMENTS 419,219 A 1/1890 Rosenfield (Continued)

FOREIGN PATENT DOCUMENTS

DE 39 33 512 A11 4/1991

(Continued)

OTHER PUBLICATIONS

Yukio Sakamoto, Hitachi Contr Mach Co., Ltd., "Differential Pressure Sensor," Patent Abstracts of Japan, JP 03 287037, p. 1328, vol. 016 (Mar. 24, 1992).

*Primary Examiner*—Andre J. Allen
*Assistant Examiner*—Jermaine Jenkins
(74) *Attorney, Agent, or Firm*—Bacon & Thomas, PLLC

(57) ABSTRACT

The invention relates to a pressure measuring cell comprising a base body, a membrane that is connected to the base body, thus forming a measuring chamber. During operation, the membrane is subjected to a deflection which is dependent on a pressure that is to be measured. The cell also comprises a membrane bed, formed by a surface of the base body that faces the membrane, at least one electrode being mounted on said bed. Said electrode, together with a counter-electrode that is mounted on the membrane, forms a capacitor, whose capacitance represents a measurement for the deflection of the membrane. The measuring cell is characterized in that the electrode is electrically connected through the base body and that the measuring chamber has a smooth surface in the contact zone, said surface having a contact pin that is guided in a bore through the base body. The electrode is electrically connected by means of said pin for measuring the capacitance and the pin is soldered into the bore on the membrane side, using a solder. The contact pin, the solder and the membrane bed form a smooth surface.

8 Claims, 2 Drawing Sheets

U.S. PATENT DOCUMENTS

| | | | |
|---|---|---|---|
| 4,398,194 A | | 8/1983 | Johnston |
| 4,581,676 A | * | 4/1986 | Baxter et al. ............ 361/283.4 |
| 4,787,249 A | * | 11/1988 | Duppui et al. ................ 73/708 |
| 5,050,034 A | | 9/1991 | Hegner et al. |
| 5,323,643 A | * | 6/1994 | Kojima et al. ................ 73/115 |
| 5,400,489 A | * | 3/1995 | Hegner et al. ............. 29/25.41 |
| 5,539,611 A | * | 7/1996 | Hegner et al. ........... 361/283.4 |
| 6,267,009 B1 | * | 7/2001 | Drewes et al. ................ 73/718 |
| 6,311,561 B1 | * | 11/2001 | Bang et al. ................... 73/708 |
| 6,374,680 B1 | * | 4/2002 | Drewes et al. ................ 73/718 |
| 6,382,030 B1 | * | 5/2002 | Kihara et al. ................. 73/718 |
| 7,258,059 B2 | * | 8/2007 | Burczyk et al. .............. 92/104 |

FOREIGN PATENT DOCUMENTS

| | | |
|---|---|---|
| DE | 4136 995 C2 | 5/1993 |
| EP | 1 010 973 A1 | 6/2000 |

* cited by examiner

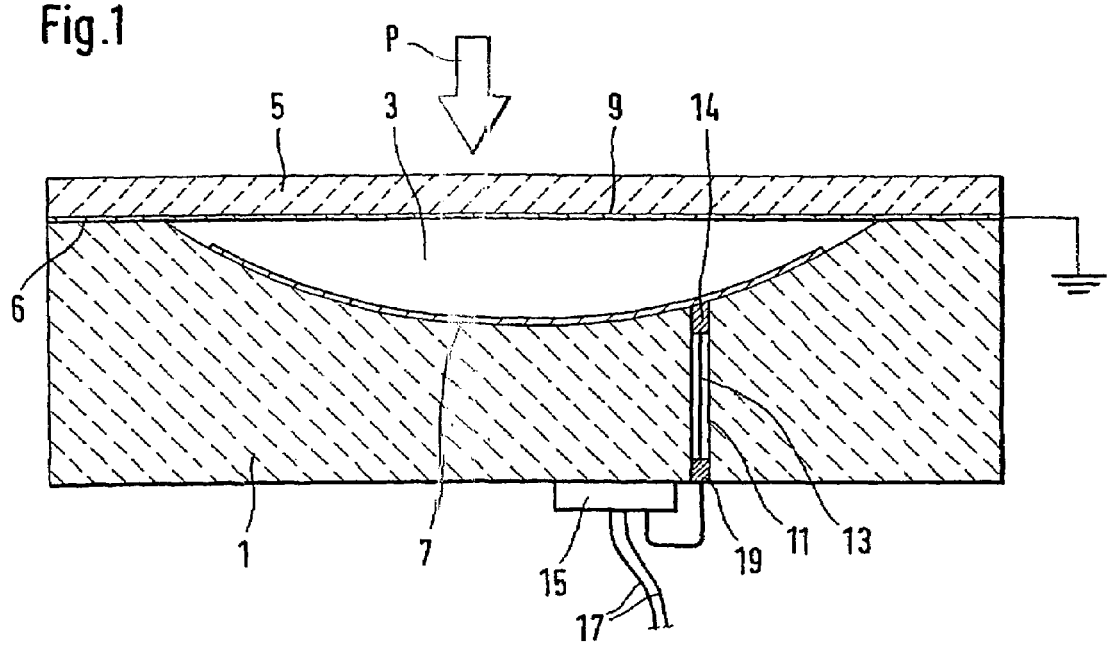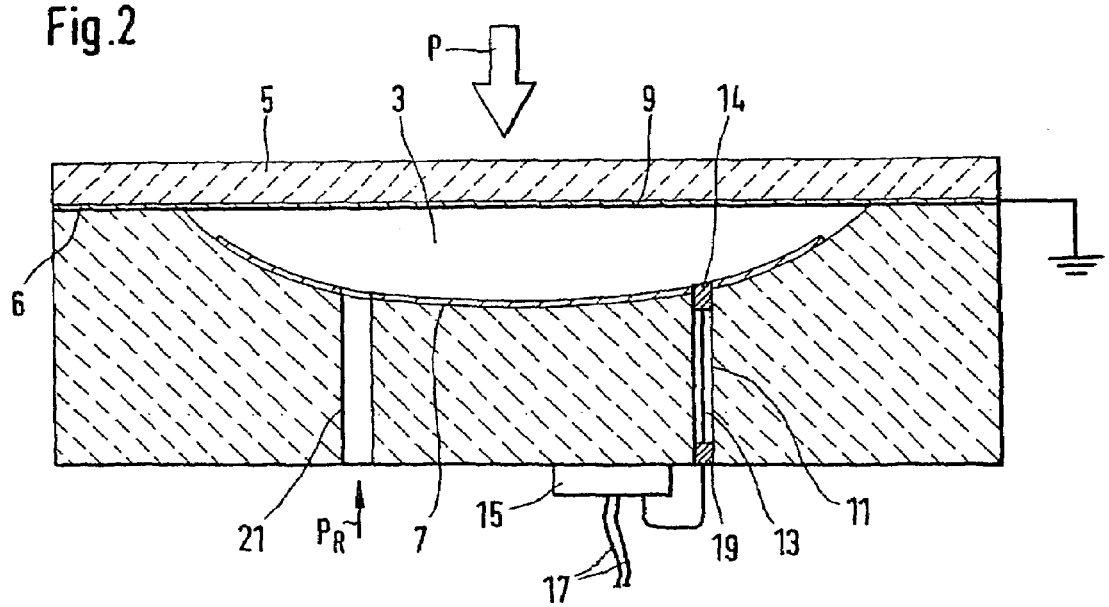

CAPACITIVE PRESSURE MEASURING CELL WITH A MEMBRANE BED

FIELD OF THE INVENTION

The present invention relates to a capacitive pressure measuring cell.

BACKGROUND OF THE INVENTION

In pressure measuring technology, absolute-pressure, relative-pressure and differential-pressure measuring cells are used. In absolute-pressure measuring cells, a pressure to be measured is detected in absolute form, that is, as a pressure difference compared to a vacuum. With a relative-pressure measuring cell, a pressure to be measured is picked up in the form of a pressure difference compared to a reference pressure, such as a pressure that prevails where the sensor is located. In most applications, at the location of use this is the atmospheric pressure. Accordingly in absolute-pressure measuring cells, a pressure to be measured is detected with reference to a fixed reference pressure, that is, the vacuum pressure, and in relative-pressure measuring cells, a pressure to be measured is detected with reference to a variable reference pressure, such as the ambient pressure. A differential-pressure measuring cell detects a difference between a first and a second pressure applied to the measuring cell.

There are pressure measuring cells on the market, having: a base body; a membrane, connected to the base body, forming a measuring chamber, which in operation executes a deflection that is dependent on a pressure to be measured; and an electrode, disposed in the measuring chamber on a side of the base body toward the membrane, which electrode together with a counter-electrode applied to the membrane forms a capacitor, whose capacitance is a measure for the deflection of the membrane.

In such pressure measuring cells, an electrical connection of the electrode can be accomplished either through an interstice between the membrane and the base body, or through the base body. In the first instance, a joining material, by which the membrane and the base body are connected to one another, must be an electrical insulator. Contacting through the base body is to be preferred, since it leaves the connection between the base body and the membrane unimpaired and thus leaves it tight and mechanically stable, and since it involves no limitation in the selection of the joining material.

In conventional contacting through the base body, a metal contact pin is inserted into a bore that penetrates the base body and is compressed on the end, for instance with an arbor. As a result, the contact pin is mechanically fixed, and an electrical contact point with the electrode of the base body is created.

In most applications, this method furnishes very good results and can be performed quickly and economically. However, applications exist in which this method of compressing is disadvantageous.

The compressing does not achieve much tightness. Vacuum tightness of the kind required in absolute-pressure measuring cells is unattainable. Consequently, especially with absolute-pressure measuring cells, a separate sealing of the through-connection is necessary.

Because of the compressing, an inside face of the measuring chamber in the region of the bore and the metal pin is uneven and has recesses, such as gaps or indentations.

These irregularities in the inside face cause problems whenever the inside face is to be used as a membrane bed, to which the membrane conforms in the event of an overload. Irregularities in the membrane bed in the event of an overload can lead to permanent changes in the membrane that can later cause grave errors of measurement or even complete failure of the pressure measuring cell.

Geometric irregularities, in particular gaps, in the region of the electrical contact point can lead under some circumstances to elevated transition resistances, with attendant disadvantages in picking up the measured value.

Further problem arise if the measuring chamber is to be filled with a pressure mediator fluid. In fluid-filled pressure measuring cells, preferably only a very slight volume of fluid is used, since thermal expansion of the fluid from temperature must be kept as slight as possible. It is correspondingly important for the measurement precision that the volume in which the liquid is placed be as constant as possible. Dents, gaps or other forms of recesses that a fluid volume of unknown size can penetrate over the course of time must absolutely be avoided. In differential-pressure measuring cells, it is especially important not only that the volume be as constant as possible but also that as much as possible the same quantity of fluid is present in both halves of the differential-pressure measuring cell. Unequal fluid quantities result in unequal temperature courses, which have a direct effect on the measurement precision.

SUMMARY OF THE INVENTION

It is an object of the present invention to provide a pressure measuring cell in which an electrode disposed on the base body in the measuring chamber is connected electrically through the base body, and in which the measuring chamber in the region of the contacting has a smooth surface and a vacuum-tight and pressureproof connection.

To that end, the present invention comprises a pressure measuring cell, having: a base body; a membrane, connected to the base body, forming a measuring chamber, which in operation executes a deflection that is dependent on a pressure to be measured; a membrane bed, formed by a surface, oriented toward the membrane, of the base body, onto which bed at least one electrode is applied, which together with a counter-electrode applied to the membrane forms a capacitor, whose capacitance is a measure for the deflection of the membrane; and a contact pin, passed through a bore through the base body, by way of which pin the electrode is electrically connected for measuring the capacitance, and which toward the membrane bed is soldered into the bore with a solder, with the contact pin, the solder, and the membrane bed forming a smooth surface.

In one embodiment, the base body and/or the membrane is of ceramic or a monocrystal.

In a further embodiment, the contact pin comprises tantalum, and the solder is an active hard solder, in particular a silver-copper solder.

In a further embodiment, in operation a pressure to be measured acts on the membrane, and a very small pressure near 0 mbar or a reference pressure that is delivered through the base body prevails in the measuring chamber.

In a further embodiment, the membrane is disposed between the base body and a further base body; the membrane and the further base body form a further measuring chamber, and in operation, a first pressure prevails in the measuring chamber; a second pressure prevails in the further measuring chamber. The deflection of the membrane depends on a pressure to be measured, which is equivalent to the difference between the first and the second pressure.

In a further feature of this latter embodiment, the base body has a continuous bore leading into the measuring chamber, into which bore a pressure tube is introduced, by way of which in operation the first pressure is delivered to the measuring chamber; and the further base body has a continuous bore leading into the measuring chamber, into which bore a pressure tube is introduced, by way of which in operation the second pressure is delivered to the measuring chamber.

Furthermore, the present invention comprises a method for producing a pressure measuring cell, in which: the contact pin is inserted into the bore; between the base body and the contact pin, a solder is introduced toward the membrane bed; the contact pin is soldered in; the membrane bed is polished; the electrode is applied to the smooth membrane bed; and the base body and the membrane are connected solidly together by joining.

In a feature of the method, the membrane is connected to the base body and to the further base body by means of a joint; and the first pressure tube is soldered into the base body and the second pressure tube is soldered into the further base body.

The invention and further advantages will now be described in further detail in conjunction with the drawing figures, which show three exemplary embodiments. In the drawings, identical elements are identified by the same reference numerals.

BRIEF DESCRIPTION OF THE DRAWINGS

FIG. 1 shows a section through a pressure measuring cell of the invention that is constructed as a capacitive absolute-pressure measuring cell;

FIG. 2 shows a section through a pressure measuring cell of the invention that is constructed as a capacitive relative-pressure measuring cell.

DESCRIPTION OF THE PREFERRED EMBODIMENTS

Figure 3:
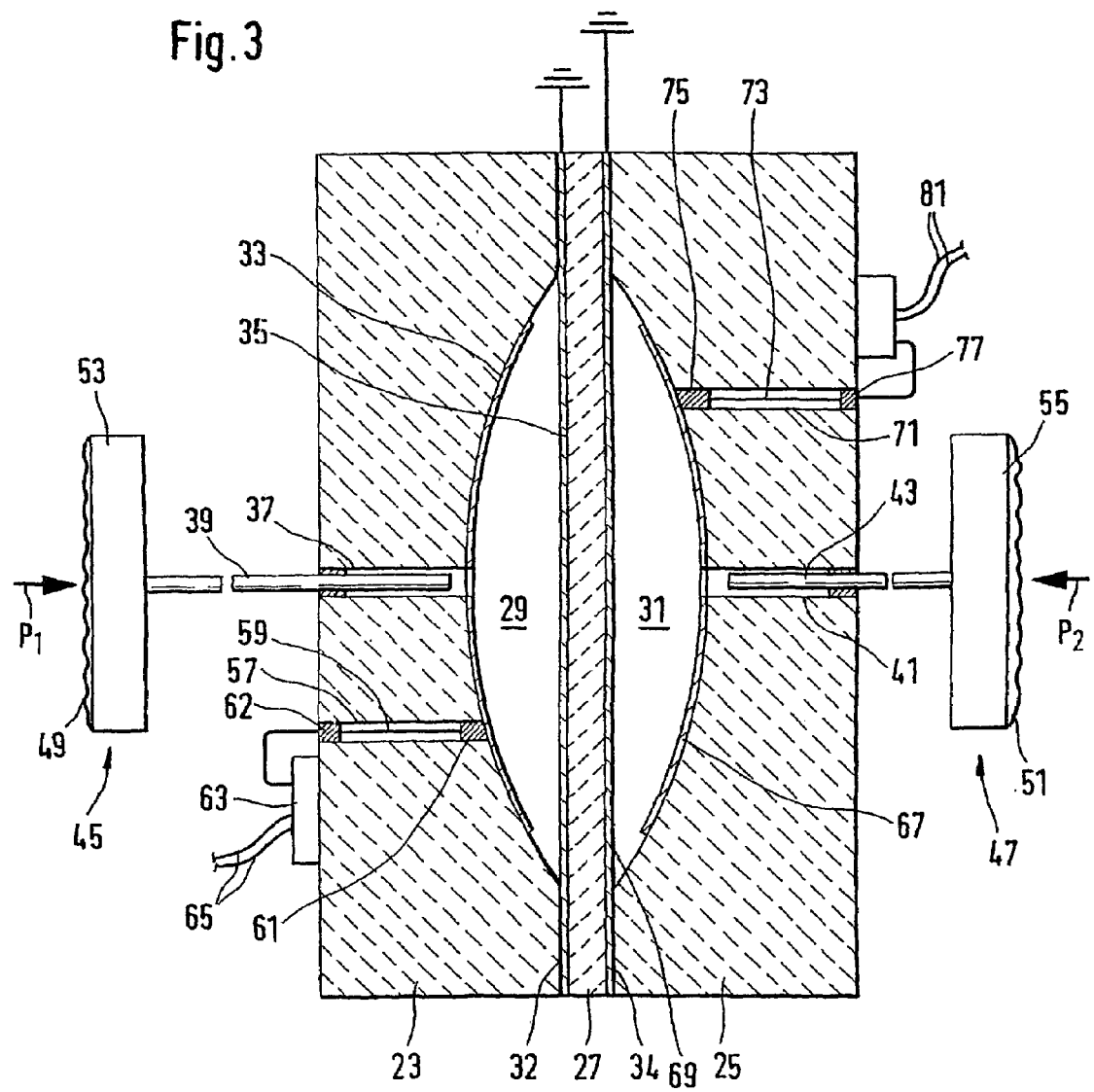
FIG. 3 shows a section through a pressure measuring cell of the invention that is constructed as a capacitive differential-pressure measuring cell.

FIG. 1 shows a section through a pressure measuring cell of the invention. It has a cylindrical base body 1 and a circular-disk-shaped membrane 5 that is connected to the base body 1, formed a measuring chamber 3.

The membrane 5 and base body 1 comprise an insulator, preferably of ceramic or a monocrystal, such as sapphire. They are connected to one another by a joint 6, for instance by means of an active hard solder, such as a zirconium-iron-titanium-beryllium solder, each on a respective outer annular edge.

In operation, the membrane 5 experiences a deflection that is dependent on a pressure p to be measured. To that end, the pressure p acts on the membrane 5, for instance on its outside. This is represented symbolically by an arrow in FIG. 1.

A surface of the base body 1 oriented toward the membrane forms a membrane bed. An electrode 7 is applied to the membrane bed and together with a counter-electrode 9 applied to the membrane 5 forms a capacitor, whose capacitance is a measure for the deflection of the membrane 5.

The counter-electrode 9, on its outer edge, electrically conductively adjoins the joint 6 and is preferably connected to ground or to a fixed reference potential via the electrically conductive joint 6.

The base body 1 has a continuous bore 11, through which a contact pin 13 is passed. The contact pin 13 comprises an electrically conductive material and is soldered into the bore 11 toward the membrane bed with a solder 14. For the contact pin 13, tantalum for instance is especially suitable, since it is a ductile material with a high melting point. It is resistant to nearly all acids and alkalis and is especially corrosion-resistant. If an aluminum oxide ceramic is used for the membrane 5 and the base body 1, tantalum offers the further advantage that it has a coefficient of thermal expansion that is very similar to that of the aluminum oxide ceramic. As the solder, an active hard solder, in particular a silver-copper solder, is especially highly suitable. With it, a hermetically sealed closure between the contact pin 13 and the bore 11 can be established.

According to the invention, the contact pin 13, solder 14, and membrane bed form a smooth surface. A clean, smooth surface, for instance a polished surface, offers the advantage that it forms a homogeneous capacitance. Such a capacitance makes a flat connection with the electrode 7 applied later, by way of which connection a highly conductive electrical connection is achieved.

A further advantage is that because of the smooth surface at this point, a membrane bed that is smooth overall is created, to which the membrane 5 can conform in the event of an overload, without suffering damage. The membrane 5 is accordingly securely intercepted even at high overloads, for instance of 40,000 kPa (400 bar), and once the overload has faded, the measuring cell continues to function properly to its specifications.

The electrode 7 for measuring the capacitance is connected electrically via the contact pin 13. To that end, a first end of the contact pin 13 is connected electrically conductively to the electrode 7. A remaining second end protrudes out of the base body 1 and is carried, in the exemplary embodiment shown, to an electronic circuit 15 disposed on the base body 1. The electronic circuit 15 converts the changes in capacitance of the capacitor into an electrical output signal, such as a correspondingly varying electrical voltage. The output signal is available for further processing and/or evaluation via connection lines 17.

To achieve greater tightness and improved mechanical stability, the contact pin can also be connected on the side remote from the membrane bed to the bore 11 by a solder 19. This additionally offers the advantage that mechanical forces cannot be transferred to the end of the contact pin 13 toward the membrane bed and thus to the electrical contact of the electrode 7. Forces exerted from outside are intercepted on the side remote from the membrane bed by the fastening to the solder 19.

In the event that the materials adjoining one another in the region of the contacting have different coefficients of thermal expansion, and that the pressure measuring cell is exposed under some circumstances to considerable temperature changes, it may be more favorable to solder the contact pin 13 in place on only one end, or to fill the bore 11 over its entire length with solder. This latter variant offers the advantage that temperature-caused stresses are distributed over the full length.

It is understood that the invention is not limited to pressure measuring cells with a single electrode and to its connection according to the invention via a soldered-in contact pin. It is understood that a plurality of electrodes may be provided, which are electrically connected in the manner described for the exemplary embodiments shown.

In FIG. 1, an absolute-pressure measuring cell is shown. The measuring chamber 3 is evacuated, so that in the interior of the measuring chamber, a very slight pressure near 0 mbar prevails, and the pressure p to be measured is detected with reference to the vacuum pressure in the interior of the measuring chamber 3.

A reference-pressure measuring cell can be constructed in an entirely analogous way. An exemplary embodiment of this is shown in FIG. 2. It is distinguished from the absolute-pressure measuring cell shown in FIG. 1 solely in the fact that the measuring chamber 3 is not evacuated. Instead, a reference pressure $p_R$ supplied through the base body 1 prevails in the measuring chamber 3. The reference pressure $p_R$ is for instance a pressure that prevails in the environment surrounding the measuring cell. For instance, as shown in FIG. 2, it can be introduced into the measuring chamber 3 through a bore 21 that penetrates the base body 1.

The pressure measuring cells shown in FIGS. 1 and 2 are produced in that the contact pin 13 is first inserted on the side toward the membrane bed flush at the front into the bore 11.

The solder 14, 19 is introduced between the base body 1 and the contact pin 13 on the side toward the membrane bed, and optionally also on a side facing the membrane bed. Next, the contact pin 13 is soldered in place on one end or both ends in a furnace in a vacuum, or in a protective gas atmosphere.

In the next work step, the membrane bed is polished, until it has a smooth surface that in particular, because of the solder 14, is gap-free.

The electrode 7 is applied, for instance by sputtering or vapor deposition, to this smooth and in particular gap-free surface. The electrode 7 preferably likewise comprises tantalum. However, other metals can also be used.

Sputtered or vapor-deposited electrodes can be produced very precisely with slight thicknesses, for instance of 0.1 μm. The smooth surface that is attainable by soldering the contact pin 13 in place is especially advantageous at these slight layer thicknesses, since even at slight layer thicknesses, it offers a good electrical contact face.

By the same method, the membrane 5 is also provided with the counter-electrode 9, and in a final work step, the joint 6 between the membrane 5 and the base body 1 is made. To that end, the joining material, such as the aforementioned zirconium-iron-titanium-beryllium active hard solder, is applied to an annular-disk-shaped surface on the edge of the base body 1, and the membrane 5 is placed on that. The base body 1 and membrane 5 are solidly connected to one another by joining in a furnace in a vacuum or in a protective gas atmosphere.

In FIG. 3, a further exemplary embodiment of a pressure measuring cell of the invention is shown. This one is a differential-pressure measuring cell. It has a base body 23 and a further base body 25. A membrane 27 is disposed between the base body 23 and the further base body 25. The membrane 27 is connected to the base body 23, forming a measuring chamber 29, and to the further base body 25, forming a further measuring chamber 31.

The membrane 27, base body 23, and further base body 25 comprise an insulator, preferably of ceramic or a monocrystal, such as sapphire. The base bodies 23, 25 are each connected to the membrane 27 by a respective joint 32, 34, for instance by means of an active hard solder, such as a zirconium-iron-titanium-beryllium solder, each at a respective outer annular edge.

In operation, a first pressure p1 prevails in the measuring chamber 29, and a second pressure p2 prevails in the further measuring chamber 31. The deflection of the membrane 27 depends on a pressure to be measured, which is equivalent to the difference between the first and second pressures p1 and p2.

For delivering the pressure, the base body 23 has a continuous bore 37, leading into the measuring chamber 29, and into which a pressure tube 39 is introduced. In operation, the first pressure p1 is delivered to the measuring chamber 29 via the pressure tube 39. Analogously, for pressure delivery, the further base body 25 has a continuous bore 41, which leads into the measuring chamber 31 and into which a pressure tube 43 is introduced. The second pressure p2 is delivered to the measuring chamber 31 in operation via the pressure tube 43.

In the exemplary embodiment shown, each of the pressure tubes 39, 43 communicates with a respective pressure mediator 45, 47. Each pressure mediator 45, 47 has a respective partitioning membrane 49, 51, each of which covers a respective chamber 53, 55. From outside, the first pressure p1 acts on the partitioning membrane 49, and the second pressure p2 acts on the second partitioning membrane 51. The chambers 53, 55, the pressure tubes 39, 43, and the measuring chambers 29, 31 are filled with a substantially incompressible fluid, such as a silicone oil. By means of the fluid, the first and second pressures p1, p2, acting on the partitioning membranes 49, 51 from outside, are each transmitted to a respective side of the membrane 27.

Precisely as with the pressure measuring cells described above, once again capacitors are used as electromechanical transducers. In this pressure measuring cell as well, an electrode 33 is applied to a membrane bed, formed by a surface toward a membrane of the base body 23, and this electrode, together with a counter-electrode 35 applied to the membrane 27, forms a capacitor whose capacitance is a measure for the deflection of the membrane 27. Via the joint 32 adjacent to it, the counter-electrode 35 is connected electrically conductively to a reference potential, such as ground.

The left half of the differential-pressure measuring cell of FIG. 3 having the base body 23, the membrane 27, the electrode 33, and the counter-electrode 35, is in principle similar to the measuring cells shown in FIGS. 1 and 2. However, as already noted, the measuring chamber 29 is fluid-filled and is connected to the pressure mediator 45.

Just as in the preceding exemplary embodiments, once again here a contact pin 59 is provided, which is passed through a bore 57 through the base body 23 and by way of which the electrode 33 for measuring the capacitance is electrically connected. The contact pin 59 is soldered in place on the side toward the membrane bed in the bore 57 with a solder 61, and the contact pin 59, solder 61, and membrane bed form a smooth, for instance polished, surface.

Preferably, the right half of the differential-pressure measuring cell is constructed identically to the left half and has an electrode 67, applied to a surface oriented toward the membrane of the base body 25, which electrode together with a counter-electrode 69 applied to the membrane 27 forms a capacitor, whose capacitance is a measure for the deflection of the membrane 27. Via the joint 34 adjoining it, the counter-electrode 69 is electrically conductively connected to a reference potential, such as ground. Just as on the left-hand side, on the right-hand side a contact pin 73 passed through a bore 71 through the base body 25 is also provided, by way of which the electrode 67 for measuring the capacitance is connected electrically. The contact pin 73 is soldered into the bore 71 with a solder 75 on the side toward the membrane bed, and the contact pin 73, solder 75, and the membrane bed form a smooth, for instance polished, surface.

Besides the advantages already named, the smooth surface in the exemplary embodiment shown in FIG. 3 has the additional advantage that there are no recesses that could be penetrated by an undefined quantity of fluid. A precisely constant volume of fluid which is as small as possible and is as much as possible identical in both halves is an important prerequisite for achieving high measurement precision.

Also analogously to the exemplary embodiments described previously above, the contact pins 59, 73 can also be soldered on a side remote from the membrane bed into the base body 23 by means of a solder 62 and into the base body 25 by means of a solder 77. However, in most applications, soldering them onto only a single side toward the membrane bed will suffice.

The contact pin 59 is connected to an electronic circuit 63, which detects the instantaneous capacitance of the capacitor and converts it into an electrical output signal, which is available for further processing and/or evaluation via connection lines 67.

Analogously, the contact pin 73 is connected to an electronic circuit 79, which detects the instantaneous capacitance of the capacitor and converts it into an electrical output signal that is available for further processing and/or evaluation via connection lines 81.

Preferably, a difference between the two capacitances is formed, and from that, the pressure difference acting on the pressure measuring cell is ascertained.

The production method for the differential-pressure measuring cell shown in FIG. 3 is essentially equivalent to the production method described earlier above. Accordingly, only the differences will be described in further detail below.

These differences essentially comprise the fact that the membrane 27 is connected to the base body 23 and to the further base body 25 by means of a joint. This can be done in a single operation. In this operation, preferably the first pressure tube 39 is also soldered into the base body 23 and the second pressure tube 43 is also soldered into the further base body 25.

The pressure tubes 39, 43 for instance comprise a special steel and are soldered into the base bodies 23, 25 for instance with an active hard solder, such as a silver-copper solder. Alternatively, higher-quality materials can be used for the pressure tubes 39, 43. Examples are tantalum or iron-nickel-cobalt alloys, of the kind attainable under the tradenames Kovar or Vacon.

Solder is first placed between the membrane 27 and the first and second base bodies 23, 25 and is introduced into the bores 37, 41. Next, the pressure tubes 39, 43 are introduced, and the measuring cell is placed in a furnace, in which the soldering operations are is done in a vacuum or in a protective gas atmosphere.

Naturally, the invention is not limited to pressure measuring cells having a single electrode. In all the exemplary embodiments described, instead of the single electrodes 7, 31, 67, it is also possible for two or more electrodes to be used for picking up a measured value and for instance for calibration purposes as well. In that case, the electrodes are disposed on the respective base body 1, 23, 25, and the individual electrodes are each connected in the manner described above by means of contact pins soldered into suitable bores.

The invention claimed is:

1. A pressure measuring cell, having:

a base body;

a membrane, connected to said base body, forming a measuring chamber, which in operation executes a deflection that is dependent on a pressure to be measured;

a membrane bed, to which said membrane conforms in the event of an overload, said membrane bed being formed by a surface, oriented toward said membrane, of said base body, onto which bed at least one electrode is applied, which together with a counter-electrode applied to said membrane forms a capacitor, whose capacitance is a measure for the deflection of said membrane; and a contact pin, passed through a bore through said base body, by way of which pin said at least one electrode is electrically connected for measuring the capacitance, and which toward said membrane bed is soldered into said bore with a solder wherein:

said contact pin, said solder, and said membrane bed form a smooth surface.

2. The pressure measuring cell of claim 1, wherein:

said base body and/or said membrane is of ceramic or a mono crystal.

3. The pressure measuring cell of claim 1, wherein:

said contact pin comprises tantalum, and said solder is an active hard solder comprising silver-copper solder.

4. The pressure measuring cell of claim 1, wherein:

in operation a pressure to be measured acts on said membrane; and a very small pressure near 0 mbar or a reference pressure that is delivered through said base body prevails in said measuring chamber.

5. The pressure measuring cell of claim 1, wherein:

said membrane is disposed between said base body and a further base body;

said membrane and said further base body form a further measuring chamber;

in operation, a first pressure prevails in said measuring chamber;

in operation, a second pressure prevails in said further measuring chamber; and the deflection of said membrane depends on a pressure to be measured, which is equivalent to the difference between said first and said second pressure.

6. The pressure measuring cell of claim 5, wherein:

said base body has a continuous bore leading into said measuring chamber, into which bore a pressure tube is introduced, by way of which in operation said first pressure is delivered to said measuring chamber; and said further base body has a continuous bore leading into said measuring chamber, into which bore a pressure tube is introduced, by way of which in operation said second pressure is delivered to said measuring chamber.

7. A method for producing a pressure measuring cell, the pressure cell having: a base body having a bore; a contact pin; a membrane bed; an electrode; and a first pressure tube, the method comprising the steps of:

inserting a contact pin into a bore;

introducing solder between the base body and the contact pin toward the membrane bed;

soldering the contact pin in;
polishing the membrane bed;
applying the electrode to the smooth membrane bed; and
connecting the base body and the membrane solidly together by joining.

8. The method for producing a pressure measuring cell of claim 7, wherein:

the membrane is connected to the base body and to the further base body by means of a joint; and
the first pressure tube is soldered into the base body and the second pressure tube is soldered into the further base body.

* * * * *